March 18, 1941.  C. LOSE, JR  2,235,227

FILTER BED CLEANING

Filed April 22, 1938

INVENTOR
CHARLES LOSE, JR.
BY
Louis L. Ansart
his ATTORNEY

Patented Mar. 18, 1941

2,235,227

UNITED STATES PATENT OFFICE 2,235,227

FILTER BED CLEANING

Charles Lose, Jr., Cranford, N. J.

Application April 22, 1938, Serial No. 203,633

8 Claims. (Cl. 210—128)

This invention relates to filter bed cleaning in filtration of liquids and more particularly to filter-bed-cleaning means adapted to travel along the upper face of a downward flow filter bed and remove the accumulated solids by passing filtered liquid back through the filter bed.

Heretofore it has been the practice in many filtration plants to maintain filter beds of granular material, such as sand, in continuous operation by the use of overhead cleaning devices which are shifted from one portion of the filter bed to another so that part of the bed may be cleaned while the rest of it is in regular use. Particularly in sewage purification, the sewage is fed to a settling tank in which a large proportion of the solids are removed and the supernatant liquid is passed through a filter bed of granular material, such as sand.

In many of such prior installations the settling tank is of a type in which the settled solids constituting sludge are fed to a central outlet at the bottom of the tank and the supernatant liquid overflows into a channel extending along the periphery of the settling tank. This channel is provided with a filter bed of sand or other suitable material providing at the bottom of the channel a chamber in which the filtered sewage or liquid collects and from which it is withdrawn from the apparatus. The cleaning of the filter bed is effected in many instances by a cleaning device which travels around the channel and by use of liquid jets and suitable suction means, removes the accumulated solids from the filter and discharges them with the accompanying liquid back into the settling tank for further removal to as great an extent as possible by settling. In this manner the filter bed is kept sufficiently clean for satisfactory operation.

In tanks of this character the sludge is usually worked to the center of the bottom of the tank by devices projecting downwardly from a frame supported rotatably at the center of the tank at the peripheral wall by one or more wheels resting on a rail. This rotating frame moves very slowly and is advantageously used to carry the filter bed cleaning device. With this moving cleaner device it is difficult to use filtered sewage for cleaning purposes and the cleaning liquid in general use is obtained by pumping sewage from the settling tank. This unfiltered sewage after it has been forced into the sand of the filter bed to wash out the accumulated solids, is removed by pumping means associated with the cleaner and returned to the settling tank. The sewage thus used for cleaning purposes contains in suspension a large proportion of sewage solids which may remain in the sand and pollute it, causing fermentation and resulting in a great loss of efficiency in the filter.

The main object of the present invention is to provide for improved filter bed cleaning by which such disadvantages will be obviated. Another object of the invention is to provide for the cleaning of a downward flow filter bed by a cleaner traveling over the filter bed and effecting cleaning by drawing filtered liquid back through the filter. A further object of the invention is to provide a traveling filter bed cleaner adapted to produce cleaning by introducing compressed air into the bottom of the portion of the filter bed beneath a traveling cleaner to open up the filter bed and produce an air lift effect whereby filtered sewage will be drawn upwardly through the bed into said cleaner. Another object of the invention is to provide a traveling cleaner, for a downward flow filter bed, provided with agitating or raking devices extending substantially to the bottom of the bed and opening passages from the top to the bottom of the bed and suction means for drawing filtered sewage back through the passages thus formed in the bed.

In carrying out this invention according to one embodiment, use may be made of compressed air in the place of liquid sewage for cleaning the sand of the filter bed. To this end air may be forced into the filter bed through hollow teeth which travel through the sand and stir up the same while the air is being forced into the filter bed. The air is released at the tips of the jets close to the bottom of the sand filter bed and expanding disrupts the sand. The air also has an air lift action on the water in the filter bed as well as upon the filtered water that is passed through the sand and remains in contact therewith directly below the screen which maintains the filtered sand in place. The air lift action in the filter bed cause the loosening solids with accompanying liquid to be carried upwardly into a chamber which isolates the part of the filter bed which is being cleaned from the liquid over the rest of the filter bed. From this chamber the solids and accompanying liquid may be withdrawn and preferably discharged into the settling tank. In this way the sand of the filter bed is washed by the filtered sewage drawn upwardly through the bed and due to the clean liquid thus obtained the efficiency of the filter is gradually increased.

According to another embodiment of the invention, the material of the filter bed is agitated and stirred by moving through the sand teeth extending downwardly to the lower part of the bed and shaped to maintain in the filter bed at the rear of each tooth a passage extending from the top of the bed substantially to the bottom of the bed, and filtered liquid is drawn upwardly through said passages by suction means associated with the cleaner.

Other features, objects and advantages will appear upon consideration of the following detailed description and of the drawing in which.

Figure 1:
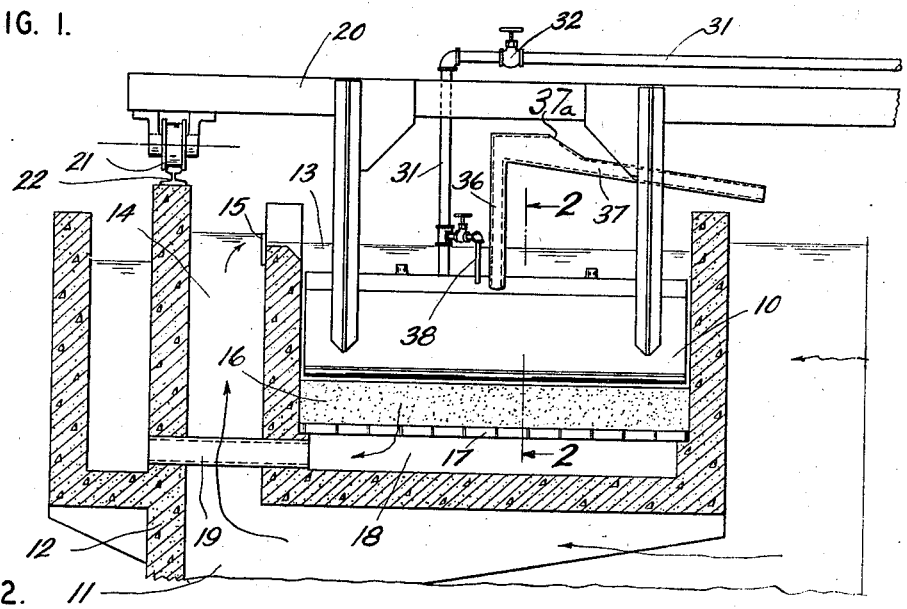
Fig. 1 is a sectional elevation illustrating a preferred embodiment of the invention applied to the filter of a combined settling and filtration unit.

Referring to Fig. 1, a cleaner 10 embodying a preferred form of the present invention is illustrated in connection with a combined settling and filtration apparatus comprising a tank 11 having a peripheral wall 12 and provided with a channel 13 extending around the periphery of the tank. A channel of this kind may be located either inside or outside of the tank proper but as here shown is within the peripheral wall of the tank and spaced therefrom to provide a passage 14 between the tank and the peripheral wall of the tank so that the liquid may rise in this passage and flow over a weir 15 into the channel 13. This channel is provided with a filter bed 16 of sand or other suitable material maintained in suitable position by a support 17 which is spaced from the bottom of the channel so as to provide a filtered liquid compartment or chamber 18 from which the liquid may pass through ducts 19 to an effluent channel or launder at the outside of the peripheral wall 12.

The tank 11 is provided with the usual frame 20 rotatably mounted at the center of the tank and supported at its outer end on the peripheral wall 12 by means of one or more wheels 21 arranged to travel on a rail 22 mounted on the top of said peripheral wall 12. The frame 20 which is used to carry the devices for shifting the settled sludge to the center of the tank may be used to support the cleaner 10 as by means of arms connected at their upper ends to the frame and at their lower ends to the cleaner 10.

Figure 3:
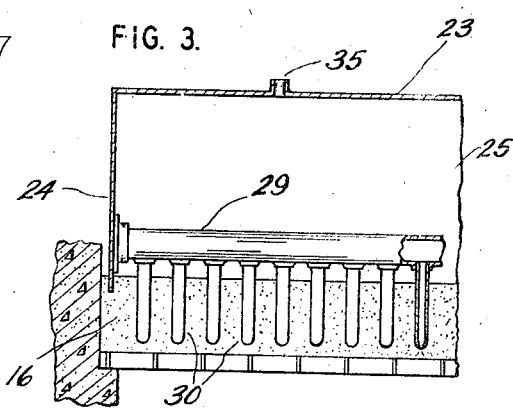
Fig. 3 is a section taken along the line 3—3 of Fig. 2.

The cleaner 10 may include a chamber 23 of which the ends 24 are designed to project downwardly into the sand of the filter bed. The back wall 25 is provided with an outwardly and upwardly turned edge to rest on the top of the filter bed and the front wall 27 is provided with a device 28 slightly raised above the filter bed to permit collected solids to pass thereunder. Mounted in the chamber 23 is a compressed air manifold 29 slightly above the upper surface of the filter bed and from which hollow teeth 30 project downwardly into the filter bed and nearly to the bottom thereof so that air discharged from the lower ends of these teeth will stir up the bed substantially from the bottom thereof and enable filter liquid to be drawn up from the chamber 18 beneath the filter bed. As shown in Fig. 3 there is a considerable number of these hollow teeth and they serve to stir up the filter bed as the cleaner travels along the channel.

Compressed air may be supplied to the manifold through a pipe or duct 31 controlled by a valve 32. This duct may extend along the frame to the center of the tank where air may be supplied in any suitable way as through a pipe (not shown) coming up through the central support for the frame. The manifold 29 is located near the front wall of the chamber of the cleaner immediately beneath a baffle or deflector 33 extending from the lower edge of the front wall upwardly and rearwardly to a level near the top of the chamber, so that the solids and liquid moved upwardly by the compressed air will pass to the top of the chamber near its rear and will pass over the top of the baffle into a compartment 34 at the front of the chamber. In order to dispose of the large volume of expanded air coming up with the liquid and solids, the chamber may be provided at its top with a suitable vent 35.

The liquid and accumulated solids in the compartment between the baffle and the front wall of the chamber may be removed as the cleaning continues. Such removal may be effected in any suitable manner but preferably the solids and liquid are removed from this compartment through a substantially vertical duct 36 which receives the liquid and solids at a point near the bottom of the compartment above the baffle and discharges into a duct 37 which in turn discharges the solids and liquid or wash water into the settling tank. The withdrawal of the solids and liquids through the duct 36 may be effected by means of a branch air line 38 connected at one end to the air supply line and at its other end to an air diffuser 39 in the lower end of the upright duct. This branch line may be controlled by a suitable valve. The air in the stream passing upwardly through the duct or pipe 36 may be collected in an enlarged portion of the receiving end of duct 37 and discharged through a vent 37a.

Figure 2:
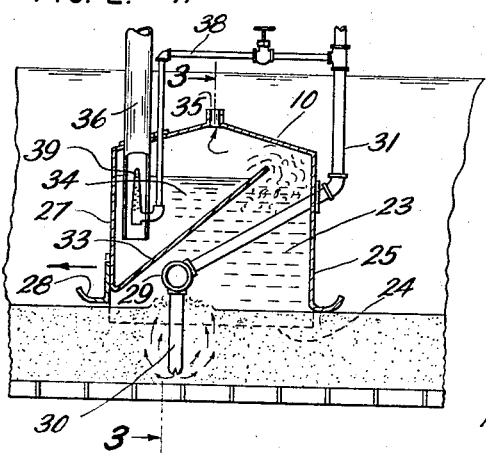
Fig. 2 is a section taken along the line 2—2 of Fig. 1.

During operation of the apparatus illustrated in Figs. 1, 2 and 3, the cleaner 10 will move at a relatively slow speed along the channel 10 and the portion of the filter bed will be cleaned. Although the cleaner has been referred to as attached to the frame which operates the sludge-collecting means, it will be obvious that the travel of the cleaner may be effected in other ways. As the cleaner moves in the direction of the arrow appearing at the left of Fig. 2, the filter material or medium is raked or stirred up by the hollow teeth 30 and the compressed air discharged from the lower ends of the teeth expands very rapidly and not only loosens and opens the sand so that very little resistance to the passage of liquid remains, but produces an air lift effect to draw filtered liquid or sewage upwardly from beneath the filter bed to the chamber 23 and at the same time to wash sewage solids from the filter bed and lift them into the chamber. The stream of air, liquid and sewage solids will continue its flow upwardly at the rear of the inclined baffle and flow over the top of the baffle, in the compartment 34 where the liquid and solids collect, the air which expands to a considerable volume passing out of the cleaner through the vent 35. The solid-containing liquid or wash water is then returned to the settling tank through the ducts 36 and 37 by the air lift action produced by the air diffuser 39 in the lower end of the duct or pipe 36.

Figure 4:
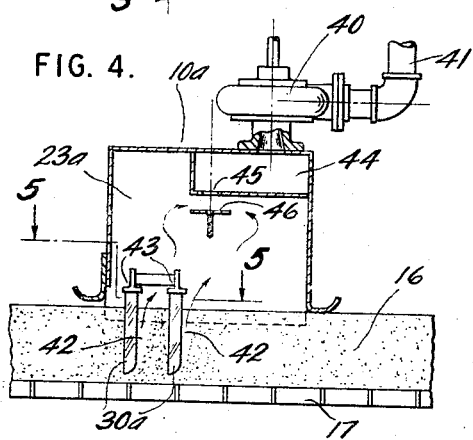
Fig. 4 is a view similar to Fig. 3, of a modified form of the invention.
Figure 5:
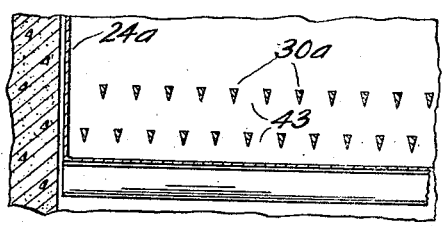
Fig. 5 is a sectional view on the line 5—5 of Fig. 4.

In Figs. 4 and 5, there is illustrated a cleaner 10a representing a modified form of cleaner comprising a chamber 23ª having end walls 24ª. In this form of cleaner there is no use of compressed air to open up the filter bed and cause an upward flow of liquid, the opening of the filter bed being effected by means of suitably shaped members or teeth 30ª extending downwardly through the filter bed 16 substantially to the bottom thereof and the upward flow of filtered liquid is produced by suitable means including a suction pump 40 connected with the upper part of the chamber 23ª and discharging the solid-bearing liquid or wash water through a pipe 41 to any desired place, for example into the settling tank 11.

To obtain the best results, the teeth 30ª should be so shaped as to provide a passage 42 in the filter bed back of each tooth. Preferably each tooth is of triangular cross section with a sharp angle at its front and with its sides extending rearwardly far enough to provide a relatively wide rear face, and at its lower end is rounded upwardly to the rear. The teeth 30ª may be arranged in rows with the teeth of adjacent rows staggered with respect to each other. The teeth of each row may be attached at their upper ends to supports 43 extending from end to end of the chamber 23ª and positioned near the bottom of the chamber and in the front part of the chamber. Preferably the suction side of the pump 40 is connected to a relatively shallow compartment 44 at the top of the chamber and extending from end to end thereof, the inlet to the compartment being in the form of a slot 45 in the bottom of the compartment near its front. To prevent short circuiting of the flow of solids and liquid to the slot 45, provision may be made of a suitable baffle 46.

In the operation of the cleaner 10ª illustrated in Figs. 4 and 5, the teeth 30ª stir up the filter material and maintain the material open at their rear faces so that filtered liquid beneath the filter bed 16 may be drawn up through passages 42 to wash the sand or other filter material. This wash water with the solids taken up thereby will then pass through the compartment 44 to the pump 40 from which it will be discharged through pipe or duct 41.

It should be understood that various changes may be made and that various features may be used without others without departing from the true scope and spirit of the invention.

What I claim is:

1. A filter bed cleaner adapted for movement over a downward-flow filter bed of which the under surface is engaged by the filtered liquid, comprising a chamber with an open bottom adjacent the upper surface of said bed, means for stirring up said filter bed substantially from top to bottom thereof beneath said chamber and opening portions thereof to facilitate the upward passage of liquid through said filter bed, and means for introducing compressed air into the lower parts of such open portions to effect upward-movement through such open portions and into said chamber of filtered liquid from beneath said bed.

2. A traveling filter bed cleaning device for cleaning a downward-flow filter bed of which the under surface is engaged by the filtered liquid, comprising a chamber with an open bottom adjacent the upper surface of said bed, a plurality of hollow teeth extending downwardly from said chamber to the lower part of said bed, said teeth serving to rake and agitate the material of said bed during the movement of the device and to discharge air into said bed to effect an upward flow therewith into said chamber of accumulated solids and accompanying liquid, a vent in the upper part of said chamber to carry off the excess air and means for withdrawing the solids and liquid from said chamber.

3. A traveling filter bed cleaning device for cleaning a downward-flow filter bed of which the under surface is engaged by the filtered liquid, comprising a chamber with an open bottom adjacent the upper surface of said bed, a plurality of hollow teeth extending downwardly from said chamber to the lower part of said bed, said teeth serving to rake and agitate the material of said bed during the movement of the device and to discharge air into said bed to effect an upward flow therewith into said chamber of accumulated solids and accompanying liquid, a vent in the upper part of said chamber to carry off the excess air, a partition, with the upper edge spaced from the top of the chamber, setting off a discharge section from the open bottom and the upward flow of air, solids and liquid and means for withdrawing from said discharge section solids and liquid overflowing said partition.

4. A traveling filter bed cleaning device for cleaning a downward-flow filter bed of which the under surface is engaged by the filtered liquid, comprising a chamber with an open bottom adjacent the upper surface of said bed, a plurality of hollow teeth extending downwardly from said chamber to the lower part of said bed, said teeth serving to rake and agitate the material of said bed during the movement of the device and to discharge air into said bed to effect an upward flow therewith into said chamber of accumulated solids and accompanying liquid, a deflector connected with the bottom of the front wall of said chamber and extending upwardly and rearwardly to set off a separate collection section but spaced from the top of the chamber, an air vent in the upper part of said chamber to carry off the excess of air and means for withdrawing the solids and liquid from said collection section.

5. A traveling filter bed cleaning device for cleaning a downward-flow filter bed of which the under surface is engaged by the filtered liquid, comprising a chamber with an open bottom adjacent the upper surface of said bed, a plurality of hollow teeth extending downwardly from said chamber to the lower part of said bed, said teeth serving to rake and agitate the material of said bed during the movement of the device and to discharge air into said bed to effect an upward flow therewith into said chamber of accumulated solids and accompanying liquid, a deflector connected with the bottom of the front wall of said chamber and extending upwardly and rearwardly to set off a separate collection section but spaced from the top of the chamber, a vent in the upper part of said chamber to carry off excess air and air-lift means for withdrawing from said collection section solids and liquid overflowing said partition.

6. A traveling filter bed cleaning device adapted for cleaning a downward-flow filter bed of which the under surface is engaged by the filtered liquid, comprising a chamber with an open bottom adjacent the upper surface of said bed, a compressed air manifold extending across the front part of said chamber near its bottom, a plurality of hollow teeth extending downwardly from said manifold to the lower part of said bed, said teeth being adapted to agitate the material of said bed during the movement of the device and to discharge compressed air into said bed to effect an upward flow therewith into said chamber of accumulated solids and accompanying liquid, an inclined deflector extending from the lower part of the front of said chamber upwardly and rearwardly over said manifold to direct the solids and liquid in said upward flow to the rear upper part of the chamber to enable the liquid and solids to overflow into a discharge section above said deflector, and means for removing the solids and accompanying liquid from said discharge section.

7. A traveling filter bed cleaning device adapted for cleaning the bed of a downward-flow filter liquids in which the downward-flow is produced by a difference in head at opposite sides of said bed, comprising a chamber with an open bottom adjacent the upper surface of said bed, means for traveling with said chamber and extending downwardly therefrom into the filter bed to agitate the same and introduce compressed air to cause an upward flow of air, accumulated solids and liquid, means for removing excess air from the chamber, and means for withdrawing solids and accompanying liquid.

8. The method of cleaning a filter bed in use for downward filtration of liquid in which the downward-flow is produced by a difference in head at opposite sides of said bed which comprises maintaining a fixed area of the filter bed isolated from the main body of the liquid above the filter, varying the position of this area over the filter bed to advance the cleaning of the filter bed, agitating from above the filter bed at the area under treatment and introducing compressed air into the filter bed in said area to release and lift the accumulated solids and accompanying liquid, removing the excess air from the mixture thus lifted, and removing the resulting solids and accompanying liquid to a point remote from the filter.

CHARLES LOSE, JR.